US007421230B2

(12) United States Patent
Honda

(10) Patent No.: US 7,421,230 B2
(45) Date of Patent: Sep. 2, 2008

(54) IMAGE FORMING APPARATUS AND METHOD THAT PERFORMS IMAGE-PROCESS MAGNIFICATION ALTERATION TO IMAGE DATA

(75) Inventor: Masashi Honda, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 170 days.

(21) Appl. No.: 11/221,987

(22) Filed: Sep. 9, 2005

(65) Prior Publication Data

US 2007/0059042 A1 Mar. 15, 2007

(51) Int. Cl.
*G03G 15/04* (2006.01)
*H04N 1/393* (2006.01)
*H04N 1/04* (2006.01)

(52) U.S. Cl. ........................ 399/196; 358/454; 358/533

(58) Field of Classification Search ................. 399/196, 399/200, 51; 358/505, 528, 533, 474, 448, 358/454

See application file for complete search history.

(56) References Cited

U.S. PATENT DOCUMENTS 4,812,915 A 3/1989 Tada
5,764,370 A * 6/1998 Amakawa et al. ....... 399/196 X
6,271,933 B1 * 8/2001 Asai et al. .................... 358/1.2
2003/0112475 A1 * 6/2003 Shoda et al. ................ 358/474

FOREIGN PATENT DOCUMENTS

JP 9-284479 A 10/1997
JP 2005-012624 A * 1/2005

* cited by examiner

*Primary Examiner*—Sophia S Chen
(74) *Attorney, Agent, or Firm*—Foley & Lardner LLP

(57) ABSTRACT

A digital copying machine includes a CPU that executes an overall control, a scanner section, a printer section, and an image processing section that executes image processes including image-process magnification alteration. The CPU adjusts a main-scan magnification of the scanner section at 90.9%, sets the image-process magnification alteration in the image processing section at 110%, and executes a control to form an image in the printer section on the basis of image data in which these magnifications are combined.

12 Claims, 2 Drawing Sheets

IMAGE FORMING APPARATUS AND METHOD THAT PERFORMS IMAGE-PROCESS MAGNIFICATION ALTERATION TO IMAGE DATA

BACKGROUND OF THE INVENTION

1. Field of the Invention

The present invention relates to an image forming apparatus, such as a digital copier, which reads an image on an original and forms an image, and to an image forming method.

2. Description of the Related Art

Jpn. Pat. Appln. KOKAI Publication No. 9-284479 discloses a prior-art technique relating to a digital copying apparatus that can automatically find a correction coefficient of magnification in a main scan direction. This digital copying apparatus includes memory means for storing image data that is obtained by reading two marks provided immediately after a white reference plate for shading correction, and measuring means for measuring a distance between the two marks. In this case, the digital copying apparatus reads once again a printed document on which the image data stored in the memory means is printed. The image data, which has been read once again, is stored in the memory means, and the distance between the two marks is measured. A correction coefficient for magnification adjustment is found from the first measured value and the re-measured value. Thereby, this digital copying apparatus can automatically calculate the correction value of the magnification.

In the prior-art digital copying apparatus, however, the main-scan magnification is adjusted by a machine-based mechanism. The magnification adjustment in the main scan direction is a trade-off between MTF (focusing) characteristics and magnification characteristics. Thus, there is a limit to the precision in setting the main-scan direction magnification at 100%, and an error of about ±0.5% would occur. In addition, when adjustment is executed using an image processing circuit, a very fine magnification process relating to a magnification of about 100% is executed by an image process. Consequently, moiré would possibly occur, and the application of this technique is difficult.

BRIEF SUMMARY OF THE INVENTION

The object of an aspect of the present invention is to provide an image forming apparatus and an image forming method, which can form an image by remarkably reducing the possibility of occurrence of moiré and adjusting a main-scan magnification with high precision.

According to an aspect of the present invention, there is provided an image forming apparatus that reads an image on an original by a scanner section and forms an image, comprising: adjustment means for adjusting a main-scan magnification of the scanner section in such a manner that the image is read with a size different from a size of the original; and image processing means for subjecting image data, which is read with the magnification that is adjusted by the adjustment means, to image-process magnification alteration to the same size as the size of the original.

According to another aspect of the present invention, there is provided an image forming method for an image forming apparatus that reads an image on an original by a scanner section and forms an image, comprising: adjusting a main-scan magnification of the scanner section in such a manner that the image is read with a size different from a size of the original; and subjecting image data, which is read with the magnification that is adjusted, to image-process magnification alteration to the same size as the size of the original.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

DETAILED DESCRIPTION OF THE INVENTION

An embodiment of the present invention will now be described with reference to the accompanying drawing.

Figure 1:
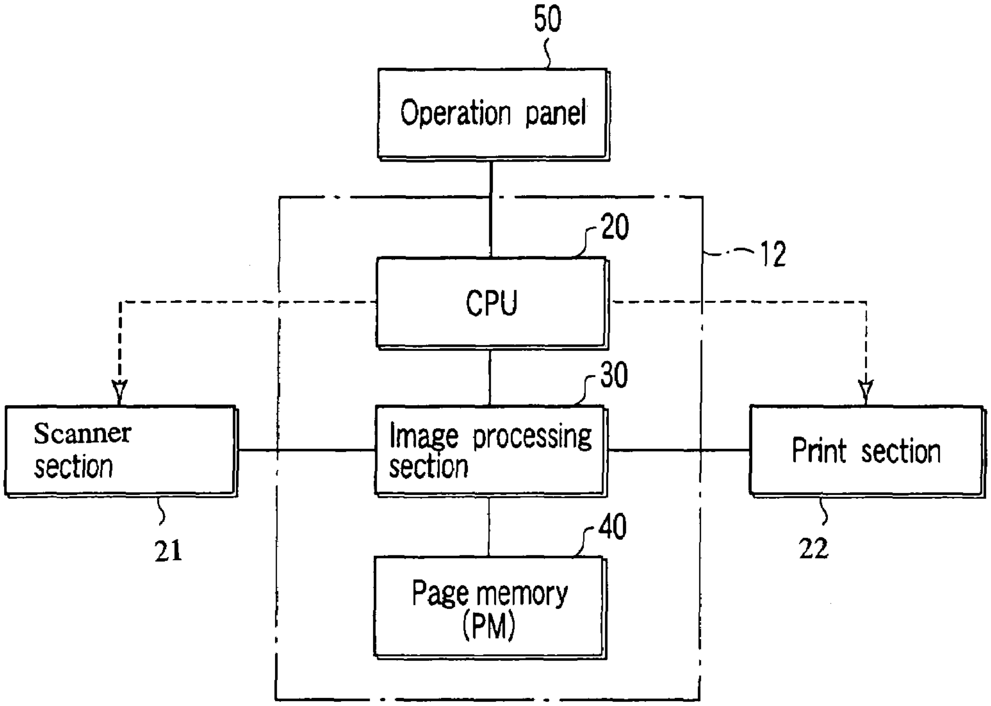
FIG. 1 is a block diagram that shows the whole structure of an image forming apparatus according to the present invention.

FIG. 1 is a block diagram that shows the whole structure of a digital copying machine according to an image forming apparatus according of the present invention. A digital copying machine 1 comprises a CPU 20, a scanner section 21, a printer section 22, an image processing section 30, a page memory 40, and an operation panel 50.

The CPU 20 executes an overall control including a control of the scanner section 21 and printer section 22.

The image processing section 30 executes an image process including a magnification alteration process for altering the magnification of image data.

The page memory 40 stores image data of one page or two pages.

The operation panel 50 executes various operations including the setting of magnification.

The CPU 20, image processing section 30 and page memory 40 are formed on a CCD control board 12, as will be described later in detail.

Figure 2:
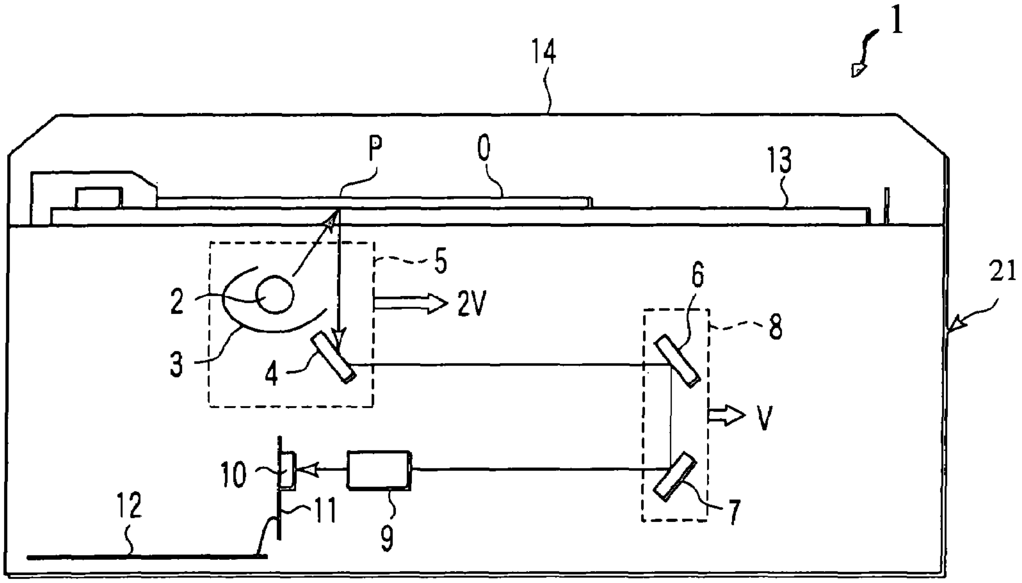
FIG. 2 is a cross-sectional view that schematically shows the structure of a scanner section.

FIG. 2 schematically shows the structure of the scanner section 21.

The scanner section 21 comprises a first carriage 5 that is composed of a light source 2, a reflector 3 for adjusting a light distribution of the light source 2 and a first mirror 4; a second carriage 8 that is composed of a second mirror 6 and a third mirror 7; a converging lens 9; a CCD sensor 10; a CCD board 11 on which the CCD sensor 10 and a sensor driving circuit (not shown) are mounted; and a CCD control board 12 that includes the CPU 20, image processing section 30 and page memory 40.

The operation of the scanner section 21 is described in brief.

When an original O is placed on an original table glass 13, the original O is put in close contact with the original table glass 13 by an original holding cover 14. Then, the light source 2, which comprises a fluorescent lamp, a xenon lamp or a halogen lamp is turned on to illuminate the original O through the original table glass 13. Reflective light from the original O at a reading position P passes through the original table glass 13, and is successively reflected by the first mirror 4, second mirror 6 and third mirror 7. The light traveling from the third mirror 7 passes through the converging lens 9 and is focused on a light receiving surface of the CCD sensor 10.

Reflective light from the original O, which is focused on the light receiving surface of the CCD sensor 10, is converted from optical energy to an electric signal in the CCD sensor 10 and is subjected to various processes in the image processing section 30 on the rear-stage CCD control board 12.

The first carriage 5 and second carriage 8 are moved in directions (to the right in FIG. 1) indicated by velocities 2V and V, respectively. Thereby, a reading position P on the original O moves. In this case, the optical path length over the distance between the reading position P and CCD sensor 10 is kept constant.

Next, the alteration of magnification in this structure is described.

Moiré that occurs mainly due to the effect of the alternation of magnification is sampling moiré.

The reason why sampling moiré occurs due to the alteration of magnification is explained below.

For example, when alternation of magnification at 100.5% is executed by an image process using a scanner with 600 dpi, 100.5% corresponds to conversion to a resolution of 603 dpi. The cycle of moiré at this time can be calculated as follows:

$$600/(603-600)\times 0.0423\ \text{mm}=8.46\ \text{mm}$$

That is, moiré occurs at a cycle of 8.46 mm.

In addition, at 101%, moiré occurs at half the cycle of 4.23 mm. This moiré tends to be easily noticeable.

Figure 3:
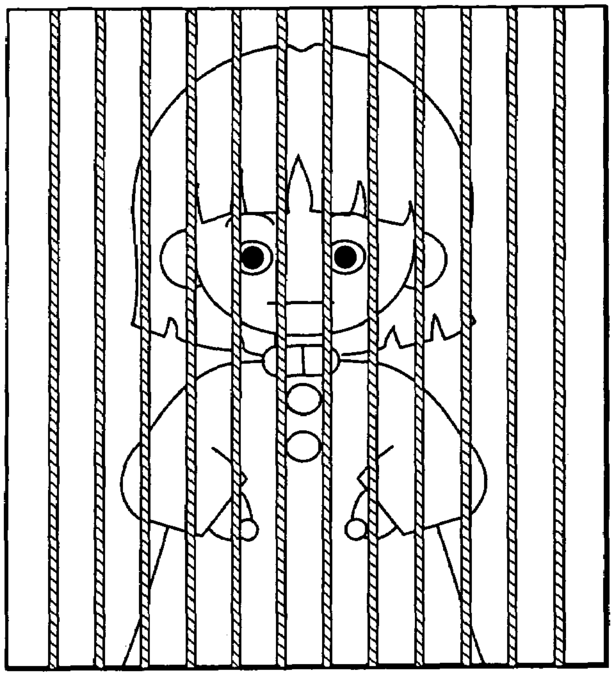
FIG. 3 shows an example of an image of moiré in a copy image at a time of enlargement at 101%.

FIG. 3 shows an example of an image of moiré on a copy image that is enlarged at a magnification of 101%. In this case, moiré at a cycle of 4.23 mm occurs, and is noticeable.

In order to make less noticeable such moiré due to the alteration of magnification in the image process, a possible method is to increase the magnification for enlargement, thereby decreasing the cycle, which relates to the principle of moiré in the image sampling process, to an unnoticeable level.

For example, 110% corresponds to conversion to a resolution of 660 dpi. The cycle of moiré at this time is 0.423 mm, and the moiré due to the image sampling process is much less noticeable than in the case of the process at 101%.

Figure 4:
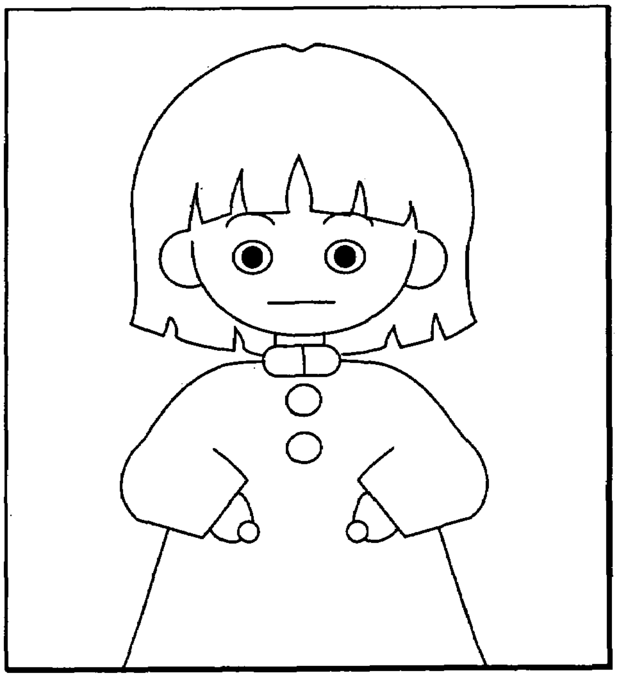
FIG. 4 shows an example of an image of moiré in a copy image at a time of enlargement at 110%.

FIG. 4 shows an example of an image of moiré on a copy image that is enlarged at a time of 110% enlargement. At the time of 110% magnification alteration, moiré due to the image sampling process is not noticeable.

As is shown in FIG. 3 and FIG. 4, moiré becomes particularly noticeable when a halftone-screen image is copied.

In the present invention, the main-scan magnification of the scanner is intentionally shifted to a great degree, thereby executing 100% magnification matching by an image process.

In the image processing section 30, the alteration of magnification is executed by the image process within a range in which the cycle of moiré is not noticeable. The image-process alteration of magnification is executed so that the cycle of moirémay become at least 3 mm or less, preferably 2 mm or less, 1 mm or less, or 0.5 mm or less. Alternatively, the image-process alteration of magnification is executed so that the cycle of moiré may become 16 mm or more.

In addition, in the image processing section 30, image-process magnification alteration is executed to increase the image-process magnification in a range between 1% and 15%, preferably at 10%. Alternatively, image-process magnification alteration is executed to decrease the image-process magnification in a range between 1% and 15%, preferably at 10%.

The main-scan magnification of the scanner section 21 is adjusted in accordance with a magnification that is set by the image process in the image processing section 30.

Alternatively, the main-scan magnification of the scanner section 21 may be adjusted in such a direction as to reduce the magnification to any one of 90%, 80%, 70% and 60%, or to a value less than 100%. Alternatively, the main-scan magnification of the scanner section 21 may be adjusted in such a direction as to increase the magnification to any one of 110%, 120%, 130% and 140%, or to a value greater than 100%. In this case, the image processing section 30 subjects image data, which is scanned with an adjusted magnification, to image-process magnification alteration process for reducing or enlarging the image data to a size of 100% that is the same as the size of the original.

Next, a specific embodiment of the invention is described.

To start with, the main-scan magnification of the scanner section 21 is adjusted at 90.9%, and the image process in the image processing section 30 is set for 110% magnification alteration, thus executing combining of magnifications.

Specifically, in the digital copying machine 1, magnification alteration is executed, as expressed by the following equation:

$$0.909\times 1.1=0.999$$

As is understood from this equation, in the digital copying machine 1, the magnification adjustment can be executed with the precision of 0.1% by using the image processing section 30. Thereby, it is possible to apply the image process in which moiré due to the image sampling process is not noticeable.

In the prior art, for the reason that moiré occurs in the magnification alteration process using the image process, the image processing section is not used to adjust the magnification at 100%, and mechanical adjustment by the scanner section is adopted. Consequently, in the mechanical adjustment of the scanner section, there is a trade-off with MTF (focusing) characteristics, and there is a limit to the precision in adjustment at ±0.5%.

In the digital copying machine 1 of the present invention, the magnification alteration by image processing in the image processing section 30 is positively executed for fine adjustment. Thus, the main-scan magnification adjustment can be executed with a precision of ±0.1%, using a region of image-process magnification alteration, in which sampling moiré is less noticeable.

In the above-described embodiment, the main-scan magnification of the scanner section 21 is set at 90.9%. Alternatively, the main-scan magnification of the scanner section 21 may be reduced to any one of 90%, 80%, 70% and 60%, or to a value less than 100%. Alternatively, the main-scan magnification of the scanner section 21 may be increased to any one of 110%, 120%, 130% and 140%, or to a value greater than 100%.

On the other hand, the image processing section 30 executes image-process magnification alteration for enlargement in the case where reduction is effected, and executes image-process magnification alteration for reduction in the case where enlargement is effected.

In the embodiment, the image formation with a size of 100% relative to the size of the original has been described. Alternatively, the main-scan magnification of the scanner section 21 may be adjusted at a magnification different from a magnification that is set by the operation panel 50, and image data that is scanned with this adjusted magnification may be subjected to image-process magnification alteration in the image processing section 30 to the magnification that is set by the operation panel 50.

As has been described above, according to the embodiment of the invention, the image-process magnification alteration is positively used for fine adjustment. Thus, the magnification of the scanner section is greatly varied to a region of image-process magnification alteration, in which sampling moiré is not easily noticeable, and the scanner is adjusted with a preference given to the MTF characteristics rather than to the precision in magnification adjustment. Thereby, the main-scan magnification adjustment with precision of ±0.1% can be executed in the image process.

Hence, both the MTF characteristics and the precision in magnification can be satisfied at the same time.

Even if the scanner section executes rough adjustment of magnification, the magnification is easily set at 100% by the image process. Thus, the adjustment value can be calculated, and the number of steps for the magnification adjustment can greatly be reduced, compared to the prior-art method.

In the prior art, as regards the magnification performance, a magnification error of ±1.5 mm occurs with respect to an original with a length of 300 mm in the main scan direction. In this invention, however, the magnification error can be reduced to ±0.3 mm.

As a result, the performance of an image forming apparatus, which is considered in usual cases, can remarkably be improved, and a practically sufficient performance can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus that reads an image on an original by a scanner section and forms an image, comprising:
- adjustment means for adjusting a main-scan magnification of the scanner section in such a manner that the image is read with a size different from a size of the original; and
- image processing means for subjecting image data, which is read with the magnification that is adjusted by the adjustment means, to image-process magnification alteration to the same size as the size of the original,
- wherein the adjustment means adjusts the main-scan magnification of the scanner section in association with a magnification that is set by the image-process magnification alteration in the image processing means.

2. The image forming apparatus according to claim 1, wherein the image processing means executes the image-process magnification alteration in a range in which a cycle of moiré is unnoticeable.

3. The image forming apparatus according to claim 1, wherein the image processing means executes the image-process magnification alteration such that a cycle of moiré is, at least, 3 mm or less, preferably 2 mm or less, 1 mm or less or 0.5 mm or less.

4. The image forming apparatus according to claim 1, wherein the image processing means executes the image-process magnification alteration such that a cycle of moiré is 16 mm or more.

5. The image forming apparatus according to claim 1, wherein the image processing means executes the image-process magnification alteration such that the image-process magnification is increased in a range between 1% and 15%, preferably at 10%.

6. The image forming apparatus according to claim 1, wherein the image processing means executes the image-process magnification alteration such that the image-process magnification is decreased in a range between 1% and 15%, preferably at 10%.

7. The image forming apparatus according to claim 1, wherein the adjustment means adjusts the main-scan magnification of the scanner section in such a direction as to reduce the magnification to any one of 90%, 80%, 70% and 60%, or to a value less than 100%.

8. The image forming apparatus according to claim 1, wherein the image processing means subjects the image data, which is read with the magnification that is adjusted by the adjustment means, to an image process that enlarges the image data to the same size as the size of the original.

9. The image forming apparatus according to claim 1, wherein the adjustment means adjusts the main-scan magnification of the scanner section in such a direction as to increase the magnification to any one of 110%, 120%, 130% and 140%, or to a value greater than 100%.

10. The image forming apparatus according to claim 1, wherein the image processing means subjects the image data, which is read with the magnification that is adjusted by the adjustment means, to an image process that reduces the image data to the same size as the size of the original.

11. An image forming method for an image forming apparatus that reads an image on an original by a scanner section and forms an image, comprising:
- adjusting a main-scan magnification of the scanner section in such a manner that the image is read with a size different from a size of the original; and
- subjecting image data, which is read with the magnification that is adjusted, to image-process magnification alteration to the same size as the size of the original,
- wherein the adjusting step adjusts the main-scan magnification of the scanner section in association with a magnification that is set by the image-process magnification alteration in the subjecting step.

12. An image forming apparatus that reads an image on an original by a scanner section and forms an image, comprising:
- an adjusting unit that is configured to adjust a main-scan magnification of the scanner unit in such a manner that the image is read with a size different from a size of the original; and
- an image processing unit that is configured to subject image data, which is read with the magnification that is adjusted by the adjusting unit, to image-process magnification alteration to the same size as the size of the original,
- wherein the adjusting unit adjusts the main-scan magnification of the scanner unit in association with a magnification that is set by the image-process magnification alteration in the image processing unit.

* * * * *